N. Du BRUL.
CIGAR-MOLD.
No. 6,967. Reissued Feb. 29, 1876.
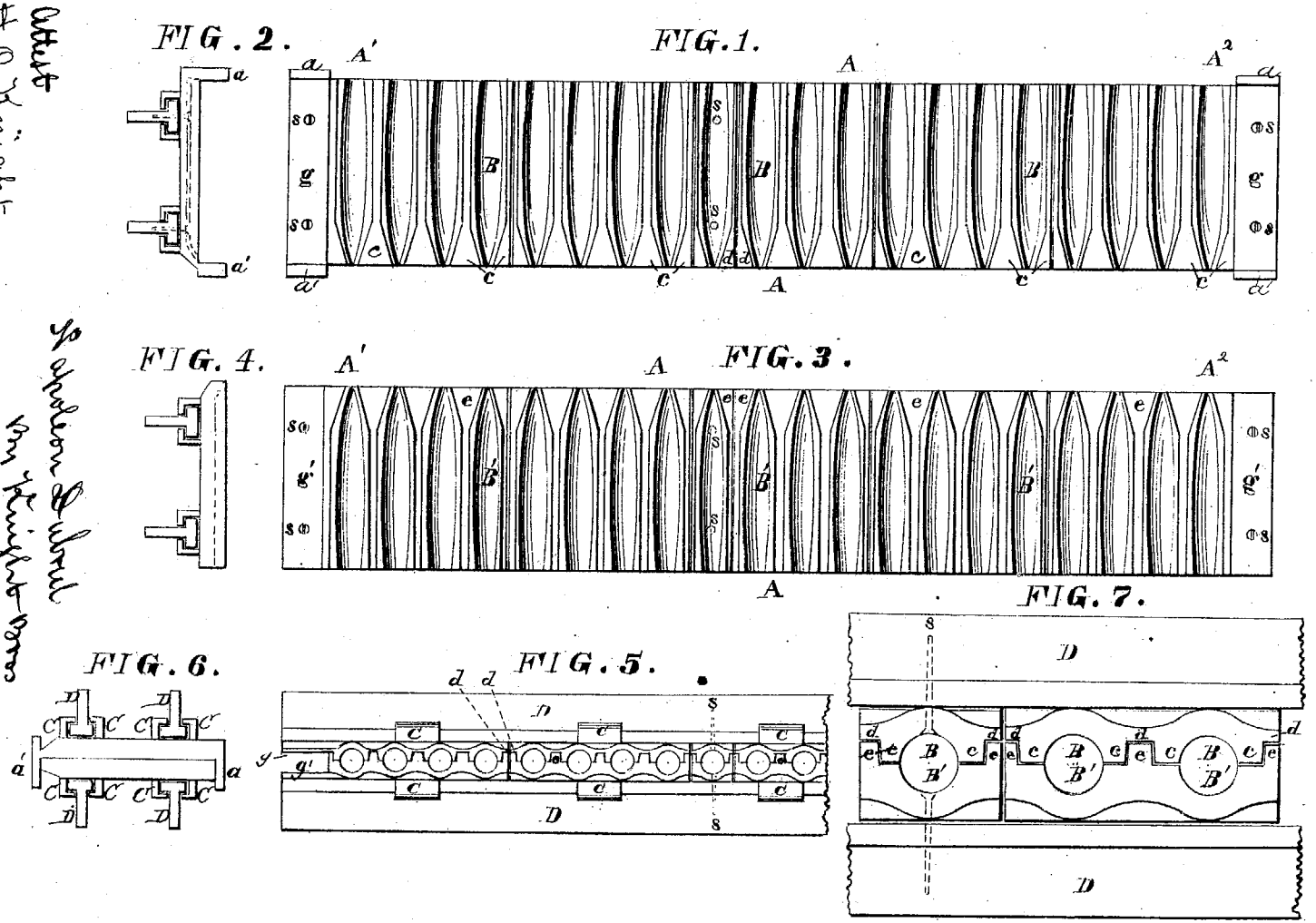
Attest
H. O. Knight
Walter Knight
Napoleon Du Brul
By Knight Bros
Attys.
N. PETERS, PHOTO-LITHOGRAPHER, WASHINGTON, D. C.

UNITED STATES PATENT OFFICE.

NAPOLEON DU BRUL, OF CINCINNATI, OHIO.

IMPROVEMENT IN CIGAR-MOLDS.

Specification forming part of Letters Patent No. 114,932, dated May 16, 1871; reissue No. 6,967, dated February 29, 1876; application filed January 6, 1876.

*To all whom it may concern:*

Be it known that I, NAPOLEON DU BRUL, formerly of Joliet, in the county of Will and State of Illinois, but now of Cincinnati, Hamilton county, State of Ohio, have invented a certain Improved Cigar-Mold; and I do hereby declare that the following is a full, clear, and exact description thereof, reference being had to the accompanying drawing, which, together with the letters and figures of reference marked thereon, forms part of this specification, and in which—

Figure 1 is face view of upper half or member of the mold, the face of the mold being turned uppermost. Fig. 2 is an end view of the same. Fig. 3 is a top or face view of the lower member of the mold. Fig. 4 is an end view of the same. Fig. 5 is a side elevation of the members joined. Fig. 6 is an end view of same. Fig. 7 is a full-size elevation of a portion of the mold, including three matrices.

My invention consists, first, in constructing a cigar-mold in sections of one or more matrices, to facilitate their accurate manufacture and adaptation to work together correctly and with precision, the several sections of each member of the mold being united by a rigid backing.

The invention further consists in constructing a cigar-mold in sections constructed with holding lugs at back and united by bars inserted in said lugs, as hereinafter described.

The invention further consists in constructing either member of a cigar-mold in sections, each consisting of one or more formers united to a rigid backing, the joints between the sections being located outside of or away from the mold-cavities, where they will not crease the cigars, and the sections of one member being provided with bearing-flanges to rest on the matrix-partitions of the other member, as hereinafter described.

To facilitate the accurate construction and correct working of the respective parts of the mold, each of its members is formed of several sections, A $A^1$ $A^2$, united by a rigid backing, and each containing one or more matrices, B B′, in which the cigars are formed or pressed. These matrices are made of a shape to give the cigars the desired form, the tobacco or cigars being placed therein while still fresh and damp from the maker's hand. In order to avoid the formation of creases in the cigars by the joints between the mold-sections, said joints are located outside or away from the matrix-cavities. C C represent lugs arranged to receive rigid bars D, to which the mold-sections are attached by nails or screws *s s*. These bars may be one or more in number, and serve to hold the sections together. The drawing shows two such bars for each member of the mold.

The two members of each matrix are adapted, as shown, to fit together after the manner of a tongue and groove, one member being constructed with projections *c c* to fit within the cavity and between the partitions *e e* of the other member, and with bearing-flanges *d d* to rest on said partitions. This construction insures the correct register of the two parts of the matrix, prevents their lateral displacement, and accurately gages the closing of the matrix.

At the ends of the mold the backing projects beyond the matrices to form recesses *g g′*, which admit the fingers of the workman in setting one member of the mold on the other, or in separating them.

To prevent displacement of the two members longitudinally of the mold-cavities, one member is furnished with projecting guides *a a′*, which fit against the sides of the other member.

I propose to construct the mold-sections and the backing of any preferred material or materials, and to connect them in any suitable manner.

Having thus described my invention, the following is what I claim as new therein and desire to secure by Letters Patent—

1. A cigar-mold, having an upper or a lower member constructed in sections of one or more matrices united to a rigid backing with the joints between them located in the divisions between the matrix-cavities.

2. The combination of the mold-sections A $A^1$ $A^2$, holding-lugs C C, and backing D, substantially as set forth.

3. A cigar-mold, constructed with an upper and a lower member fitting together with tongue-and-groove joints *c d e* between the mold-cavities, substantially as herein set forth.

4. A cigar-mold, constructed with an upper member having vertical flanges or followers *c c* fitting within the cavities of the lower member, and horizontal flanges *d d* resting on the edges of the partitions *e* between said cavities, substantially as shown.

In testimony of which invention I hereunto set my hand.

NAPOLEON DU BRUL.

Attest:
GEO. H. KNIGHT,
WALTER KNIGHT.